United States Patent
Darsillo et al.

(10) Patent No.: US 6,284,819 B1
(45) Date of Patent: Sep. 4, 2001

(54) RECORDING MEDIUM

(75) Inventors: Michael S. Darsillo, Champaign, IL (US); David J. Fluck, Bel Aire, MD (US); Rudiger Laufhutte, Tuscola, IL (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/346,455

(22) Filed: Jul. 1, 1999

Related U.S. Application Data

(60) Provisional application No. 60/091,468, filed on Jul. 1, 1998.

(51) Int. Cl.⁷ ............................ C04B 12/04; C04B 28/26; C04B 35/16

(52) U.S. Cl. .................. 524/22; 524/23; 524/24; 524/25; 524/26; 524/42; 524/43; 524/44; 524/45; 524/47; 524/442; 524/444; 524/445; 524/446; 524/447; 524/448; 524/450; 524/492; 524/493; 524/497; 524/498; 524/499; 106/600; 106/603; 106/607; 106/608; 106/609; 106/610; 106/614; 106/616; 106/617; 106/618; 106/631; 106/632

(58) Field of Search .................. 524/22, 23, 24, 524/25, 26, 42, 43, 44, 45, 47, 442, 449, 445, 446, 447, 448, 450, 492, 493, 497, 498, 499; 106/600, 603, 607, 608, 609, 610, 616, 617, 618, 631, 632

(56) References Cited

U.S. PATENT DOCUMENTS

| | | |
|---|---|---|
| 3,620,978 | 11/1971 | Moore . |
| 3,691,089 | 9/1972 | Janzon et al. . |
| 3,719,607 | 3/1973 | Moore, Jr. . |
| 3,864,142 | 2/1975 | Kovarik . |
| 3,956,171 | 5/1976 | Moore, Jr. et al. . |
| 4,478,910 | 10/1984 | Oshima et al. ............... 428/331 |
| 4,554,181 | 11/1985 | Cousin et al. . |
| 4,563,298 | 1/1986 | Keiser . |
| 4,612,138 | 9/1986 | Keiser . |
| 4,770,934 | 9/1988 | Yamasaki et al. ............ 428/331 |
| 5,013,603 | 5/1991 | Ogawa et al. . |
| 5,695,820 | 12/1997 | Davis et al. . |
| 5,714,235 | 2/1998 | Takeuchi et al. .............. 428/195 |
| 5,725,946 | 3/1998 | Fukushima et al. .......... 428/342 |
| 5,804,293 | 9/1998 | Nehmsmann et al. ......... 428/307.3 |

FOREIGN PATENT DOCUMENTS

| | | |
|---|---|---|
| 0 732 219 A2 | 9/1996 | (EP) . |
| 0 826 510 | 3/1998 | (EP) . |
| 0 655 346 | 9/1998 | (EP) . |
| 0 879 709 A1 | 11/1998 | (EP) . |

OTHER PUBLICATIONS

Chapman, "Coating Structure Effects On Ink–Jet Print Quality," *1997 Coating Conference*, pp. 73–93.

Withiam, "Silica Pigment Porosity Effects on Color Ink Jet Printability," *IS&T's NIP 12: International Conference on Digital Printing Technologies*, pp. 409–417 (1996).

"More Solutions to Sticky Problems" *Brookfield Engineering Laboratories, Inc.* (Sep. 1998).

Iler, "The Chemistry of Silica, Solubility Polymerization, Colloid and Surface Properties, and Biochemistry", *Wiley–Interscience Publication*, pp. 364–407 (1979).

Triantafillopoulos, "Measurement of Fluid Rheology and Interpretation of Rheograms", *Kaltec Scientific, Inc.* (1998).

*Primary Examiner*—Nathan M. Nutter

(57) ABSTRACT

The present invention provides a recording medium comprising a substrate having a glossy coating thereon, wherein the glossy coating comprises a binder and first and second groups of particles, wherein:

(a) the first group comprises metal oxide particles, wherein the metal oxide particles are aggregates of smaller, primary particles, (b) the mean diameter of the primary particles is less than about 100 nm, (c) the mean diameter of the aggregates is from about 100 nm to about 500 nm, (d) the mean diameter of the particles in the second group is less than about 50% of the mean diameter of the aggregates in the first group, and (e) the ratio of particles in the first group to particles in the second group is from about 0.1:1 to about 10:1 by weight.

The glossy coating of the inventive recording medium has an excellent rate of liquid absorption, a relatively high liquid absorption capacity, excellent adhesiveness, and a non-brittle, crack-resistant, glossy surface. Also provided is a method of preparing a recording medium and a coating composition useful in the preparation of a recording medium.

20 Claims, 2 Drawing Sheets

RECORDING MEDIUM

CROSS-REFERENCE TO RELATED PATENT APPLICATION

This patent application claims priority to provisional U.S. Pat. App. No. 60/091,468 filed on Jul. 1, 1998.

This application claims benefit of Provisional Appln. 60/091,468 filed Jul. 1, 1998.

TECHNICAL FIELD OF THE INVENTION

The present invention relates to a recording medium, a method for the preparation of a recording medium, and a coating composition useful in the preparation of a recording medium.

BACKGROUND OF THE INVENTION

A surface coating is sometimes applied to a recording medium in order to improve its printing properties. For example, the coating can improve the appearance, ink absorption, and/or image smear resistance of the medium.

Surface coatings can be classified into two general categories—glossy coatings and non-glossy (matte or dull) coatings. Glossy coatings are often desirable, as they are very smooth, and can impart a superior feel and a photograph-like quality to a recorded image.

A coating composition comprising a pigment such as a hydrated aluminosilicate (such as a kaolin clay), titanium dioxide, alumina, silica, or calcium carbonate can be used to make a glossy coating if the composition is applied by cast coating, wherein the composition is dried while contacting a polished metal cylinder or drum (e.g., a polished chromium drum). A glossy pigment coating prepared in this manner is advantageous not only for its gloss, but because the pigment can impart a relatively high rate and capacity of ink absorption to the coating as well. However, the cast coating procedure is relatively slow and costly.

It is possible to make glossy pigment coatings using application methods which are cheaper and faster than cast coating (e.g., bar coating, air-knife coating, roll coating, etc., sometimes followed by calendering), but the overall gloss of the resulting coating is often diminished compared to cast coating. Moreover, glossy pigment coatings prepared using these rapid, inexpensive methods also can be quite brittle, and the coatings often crack and flake upon drying.

Coating compositions comprising resins such as polyolefin resin, polyester resin, polyamide resin, or polycarbonate resin can be applied using the aforementioned rapid, inexpensive coating methods (e.g., bar coating, air-knife coating, roll coating, etc.), to form coatings having a high gloss. However, a recording medium having such a glossy resin coating generally has significantly decreased rates of ink absorption and ink drying compared to a recording medium having a pigment coating.

A need exists for a recording medium having a glossy coating that can be applied using a rapid, inexpensive coating procedure, wherein the glossy coating is non-brittle, and wherein ink applied to the recording medium is rapidly absorbed, and rapidly dries. A need also exists for a method of preparing such a glossy recording medium, and for a coating composition that can be used in such a method. The present invention provides such a recording medium, method, and composition.

BRIEF SUMMARY OF THE INVENTION

The recording medium of the present invention comprises a substrate having a glossy coating thereon, wherein the glossy coating comprises first and second groups of particles, wherein:
(a) the first group comprises metal oxide particles, wherein the metal oxide particles are aggregates of smaller, primary particles,
(b) the mean diameter of the primary particles is less than about 100 nm,
(c) the mean diameter of the aggregates is from about 100 nm to about 500 nm,
(d) the mean diameter of the particles in the second group is less than about 50% of the mean diameter of the aggregates in the first group, and
(e) the ratio of particles in the first group to particles in the second group is from about 0.1:1 to about 10:1 by weight.

The coating composition of the present invention comprises a suitable carrier and first and second groups of particles, has a solids content of at least about 15% by weight, has an apparent viscosity at a relatively high shear rate of less than about 100 centipoise at 22° C., and can be applied to a substrate to form a substrate having a glossy coating thereon.

The inventive method of preparing a recording medium comprises: (a) providing a substrate, (b) coating the substrate with the coating composition of the present invention to provide a coated substrate, and (c) drying the coated substrate to form the recording medium.

The recording medium of the present invention comprises a substrate having a glossy coating thereon, wherein the glossy coating is non-brittle and crack-resistant, has an excellent rate of liquid absorption, has a relatively high liquid absorption capacity, has excellent adhesiveness, and can be applied using rapid, inexpensive coating methods. These and other advantages of the present invention, as well as additional inventive features, will be apparent from the description of the invention provided herein.

DESCRIPTION OF THE PREFERRED EMBODIMENTS

Figure 1:
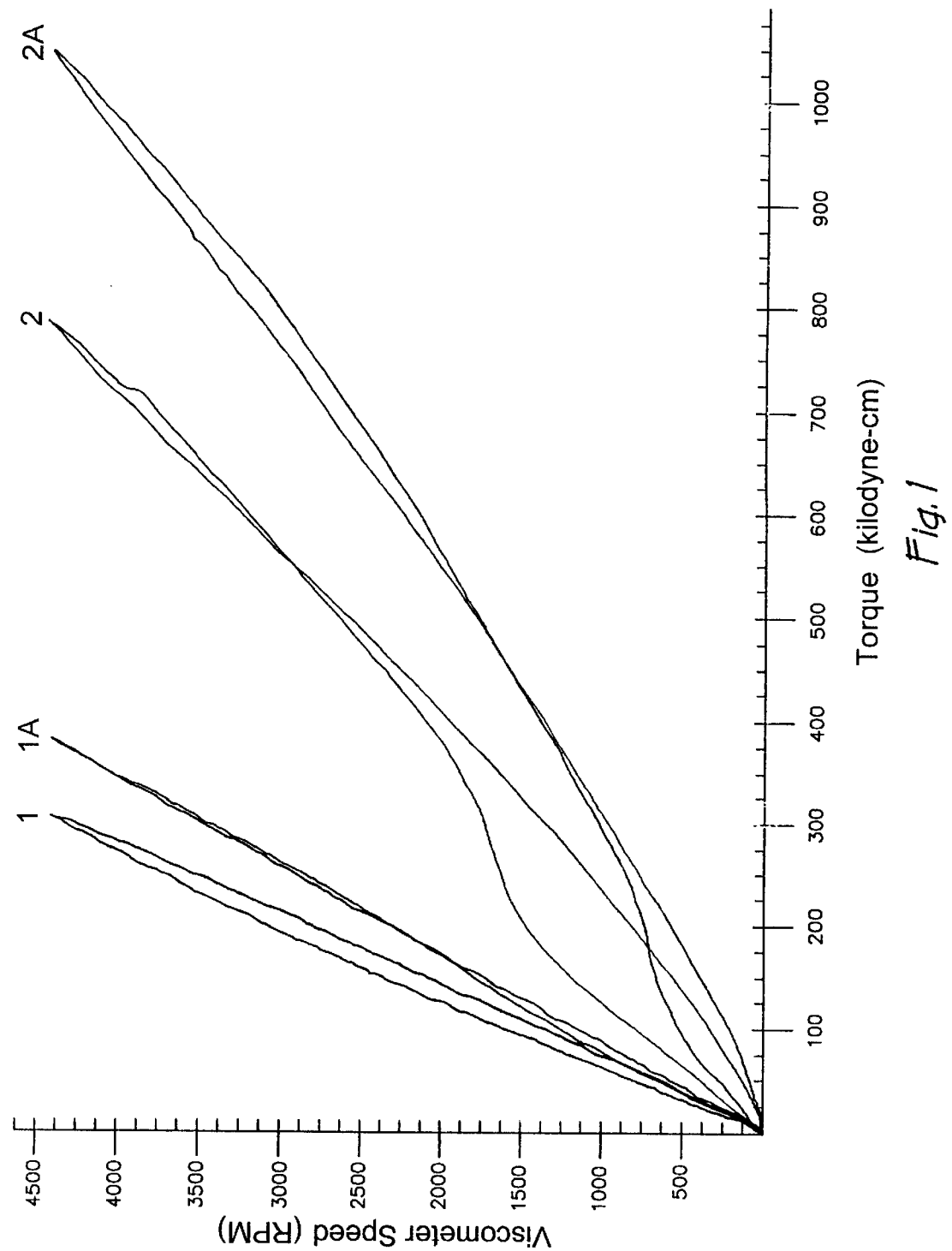
FIG. 1 illustrates the rheograms of two coating compositions of the present invention and the rheograms of two analogous coating compositions that utilize a single type of particle population.

The present invention provides a recording medium, a method for the preparation of a recording medium, and a coating composition useful in the preparation of a recording medium. It has surprisingly and unexpectedly been discovered that rapid, inexpensive coating methods can be used to provide a substrate with a non-brittle, crack-resistant, adhesive, glossy coating, wherein the glossy coating has a relatively rapid rate of liquid absorption, a relatively rapid rate of liquid drying, and a relatively large liquid absorption capacity. The glossy coating comprises first and second groups of particles, wherein the first group comprises metal oxide particles that are aggregates of smaller primary particles, and the second group comprises particles having a mean diameter of less than about 50% of the mean diameter of the aggregates in the first group.

Recording Medium

The present invention provides a recording medium comprising a substrate having a glossy coating thereon, wherein the glossy coating comprises a binder and first and second groups of particles, wherein:

(a) the first group comprises metal oxide particles, wherein the metal oxide particles are aggregates of smaller, primary particles, (b) the mean diameter of the primary particles is less than about 100 nm, (c) the mean diameter of the aggregates is from about 100 nm to about 500 nm, (d) the mean diameter of the particles in the second group is less than about 50% of the mean diameter of the aggregates in the first group, and (e) the ratio of particles in the first group to particles in the second group is from about 0.1:1 to about 10:1 by weight.

The glossiness of a recording medium can be measured, for example, in terms of the 75° specular gloss according to JIS P 8142, or an equivalent U.S. standard, using a gloss photometer (e.g., VGS-1001, manufactured by Nihon Denshoku Kogyosha), a Hunter 75° Gloss Meter, a Technidyne Glossmeter (e.g., Model T480A), or the like. Any suitable test method can be used to determine glossiness, for example, ASTM, TAPPI, or the like. When TAPPI is used, it is preferably TAPPI T480. When ASTM is used, it is preferably ASTM D1223. Desirably, the recording medium of the present invention is calendered to provide a glossier coating. It is preferred that the recording medium of the present invention has a 75° specular gloss of at least about 15%. More preferably, the recording medium of the present invention has a 75° specular gloss of at least about 25%, even more preferably at least about 35%, and still more preferably at least about 45%, yet more preferably at least about 55%, and most preferably at least about 65%.

When the substrate is a cellulose substrate (e.g., cellulose paper), the recording medium of the present invention, when calendered, preferably has a 75° specular gloss of at least about 15%, more preferably at least about 25%, even more preferably at least about 35%, and still more preferably at least about 45%. In a preferred embodiment, the recording medium of the present invention, when calendered, has a 75° specular gloss of at least about 50%.

The inventive recording medium comprises a substrate, which can be either transparent or opaque, and can comprise any suitable material. Examples of such materials include, but are not limited to, films or sheets of polyester resins (e.g., poly(ethylene terephthalate)), diacetate resins, triacetate resins, acrylic resins, polycarbonate resins, polyvinyl chloride resins, polyimide resins, cellophane and celluloid, glass sheets, metal sheets, plastic sheets, paper (e.g., cellulose paper), coated paper (e.g., resin-coated paper), pigment-containing opaque films, and foamed films. Polyester sheets and cellulose paper are preferred, with poly(ethylene terephthalate) sheets being more preferred.

The glossy coating can be applied to the substrate using any suitable method or combination of methods.

Preferably, the substrate is coated with a coating composition comprising a binder, a suitable carrier (e.g., water), and first and second groups of particles, wherein:

(a) the first group comprises metal oxide particles, wherein the metal oxide particles are aggregates of smaller, primary particles, (b) the mean diameter of the primary particles is less than about 100 nm, (c) the mean diameter of the aggregates is from about 100 nm to about 500 nm, (d) the mean diameter of the particles in the second group is less than about 50% of the mean diameter of the aggregates in the first group, and (e) the ratio of particles in the first group to particles in the second group is from about 0.1:1 to about 10:1 by weight, to provide a coated substrate. After applying the coating, the coated substrate is dried using any suitable method or combination of methods to provide the recording medium of the present invention, which can optionally be calendered to improve its glossiness.

The coating composition can be applied using any suitable method or combination of methods. Suitable methods include, but are not limited to, roll coating, blade coating, air knife coating, rod coating, bar coating, cast coating, gate roll coating, wire bar coating, short-dowel coating, slide hopper coating, curtain coating, flexographic coating, gravure coating, Komma coating, size press coating in the manner of on- or off-machine, and die coating, with rapid, inexpensive methods such as rod coating and air knife coating being preferred.

Suitable drying methods include, but are not limited to, air or convection drying (e.g., linear tunnel drying, arch drying, air-loop drying, sine curve air float drying, etc.), contact or conduction drying, and radiant-energy drying (e.g., infrared drying and microwave drying).

The glossy coating can be of any suitable thickness. In particular, the coating is preferably from about 1 $\mu$m to about 50 $\mu$m in thickness, more preferably from about 5 $\mu$m to about 30 $\mu$m in thickness, and most preferably from about 10 $\mu$m to about 20 $\mu$m in thickness.

The recording medium of the present invention can comprise a substrate having more than one coating layer, which can be the same or different, provided that at least one of the coating layers comprises first and second groups of particles, wherein:

(a) the first group comprises metal oxide particles, wherein the metal oxide particles are aggregates of smaller, primary particles, (b) the mean diameter of the primary particles is less than about 100 nm, (c) the mean diameter of the aggregate particles is from about 100 nm to about 500 nm, (d) the mean diameter of the particles in the second group is less than about 50% of the mean diameter of the aggregates in the first group, and (e) the ratio of particles in the first group to particles in the second group is from about 0.1:1 to about 10:1 by weight. For example, the recording medium of the present invention can comprise a substrate coated with one or more ink-receptive layers (e.g., comprising kaolin clay) and/or one or more resin-containing layers (e.g., a glossy, laminated film layer). Although the recording medium of the present invention can comprise coatings in addition to a coating comprising first and second groups of particles as described above (e.g., ink-receptive layers, glossy layers, etc.), it has surprisingly and unexpectedly been found that the above-described coating comprising first and second groups of particles provides sufficient ink receptivity and gloss for the vast majority of printing applications.

The first group (population) of particles is primarily responsible for the liquid absorption characteristics of the glossy coating. The first group preferably comprises particles of one or more metal oxides such as silica, alumina, titania, zirconia, ceria, and magnesia, with pyrogenic metal oxides and finely milled metal oxide gels being preferred, pyrogenic metal oxides being especially preferred, and pyrogenic silica being most preferred. The metal oxide can be charged or uncharged, and if charged, can be cationic, anionic, or amphoteric. It is sometimes preferred that cationic particles be included in the glossy coating. Although many metal oxides are either neutral or anionic, they can be made cationic via surface modification. For example, silica, which is anionic, can be made cationic by treating the silica with one or more inorganic cationic modifiers, for example, an inorganic salt (e.g., aluminum chlorohydrate), or the like. Likewise, silica can be made cationic by treating the silica with one or more organic cationic modifiers, for example, a silane, a polymer (e.g., a polyamine polymer), or the like.

The first group preferably comprises metal oxide particles, which are aggregates of smaller, primary particles. Because the surface area of a primary particle is inversely proportional to its size, and because a high surface area has a beneficial effect on many properties of the glossy coating (e.g., rate of liquid absorption and liquid absorption capacity), it is preferred that the primary particles have a mean diameter of less than about 100 nm (e.g., from about 1 nm to about 100 nm). More preferably, the first group comprises aggregates of primary particles, wherein the primary particles have a mean diameter of less than about 50 nm (e.g, from about 1 nm to about 50 nm), even more preferably less than about 30 nm (e.g., from about 1 nm to about 30 nm), yet more preferably less than about 20 nm (e.g, from about 1 nm to about 20 nm), and most preferably less than about 15 nm (e.g., from about 1 nm to about 15 nm). It is highly preferred that substantially all of the primary particles have diameters smaller than the mean diameter values set forth above. In other words, it is highly preferred that substantially all of the primary particles have diameters of less than about 100 nm (e.g., from about 1 nm to about 100 nm), more highly preferred that substantially all of the primary particles have diameters of less than about 50 nm (e.g., from about 1 nm to about 50 nm), even more highly preferred that substantially all of the primary particles have diameters of less than about 30 nm (e.g., from about 1 nm to about 30 nm), yet more highly preferred that substantially all of the primary particles have diameters of less than about 20 nm (e.g., from about 1 nm to about 20 nm), and most highly preferred that substantially all of the primary particles have diameters of less than about 15 nm (e.g., from about 1 nm to about 15 nm).

A metal oxide particle that is an aggregate of smaller primary particles, such as a pyrogenic metal oxide, has a porous substructure, and coatings that comprise such particles have a relatively rapid rate of liquid absorption, and a relatively high liquid absorption capacity. The rate of liquid absorption can be measured, for example, by applying a droplet of a liquid (e.g., distilled water) to the coating surface and measuring the change in the angle of the droplet with respect to the surface (contact angle) over time. Preferably, the contact angle of distilled water, when applied to the glossy coating of the recording medium of the present invention, decreases by at least about 5° over the first five minutes. More preferably, the contact angle decreases by at least about 7° over the first five minutes. Most preferably, the contact angle of distilled water, when applied to the glossy coating of the recording medium of the present invention, decreases by at least about 10° over the first five minutes.

The capacity of liquid absorption can be measured by contacting a liquid, for example, water, or a 1:1 solution of polyethylene glycol (e.g., PEG 400) and water, or the like, with a predetermined area of the glossy coating of the recording medium of the present invention for 10 seconds at 22° C., followed by contacting the medium with a blotting paper to remove excess solution, measuring the weight of the solution absorbed by the glossy coating, and expressing that weight in terms of $g/m^2$. Alternatively, the liquid absorption capacity of the coating can be measured as a function of porosity. Porosity can be measured by any suitable method, for example, by measuring the total intrusion volume of a liquid (e.g., mercury) into the glossy coating applied to a non-porous substrate (e.g., polyethylene). It will be appreciated that the total intrusion volume of a liquid for a particular coating (and, therefore, the porosity) can be a function of variables that influence the structure of the coating, for example, binder type, pigment-to-binder ratio, pigment particle size, calendering, and the like. Preferably, the porosity is determined by measuring the total intrusion volume of mercury. The glossy coating of the recording medium of the present invention, when the substrate is a non-porous substrate, preferably has a total mercury intrusion volume of at least about $0.3\ cm^3/g$, more preferably at least about $0.5\ cm^3/g$, still more preferably at least about $0.8\ cm^3/g$, most preferably about $1\ cm^3/g$ or greater. Liquid absorptivity also can be measured by applying a droplet of a suitable liquid (e.g., distilled water) to the surface of the recording medium, and measuring the change in contact angle over time as described herein.

With respect to the mean diameter of the aggregate particles in the first group, it is preferred that the aggregates have a mean diameter (as measured by a light scattering technique, for example, using a Brookhaven 90Plus Particle Scanner, available from Brookhaven Instruments Corporation, Holtsville, N.Y., of less than about 500 nm (e.g, from about 70 or 100 nm to about 500 nm), more preferably less than about 400 nm (e.g., from about 70 or 100 nm to about 400 nm), even more preferably less than about 300 nm (e.g, from about 70 or 100 nm to about 300 nm), and most preferably less than about 200 nm (e.g., from about 70 or 100 nm to about 200 nm (such as about 150 nm)). It is preferred that substantially all of the aggregate particles have diameters smaller than the mean diameter values set forth above. It is highly preferred that substantially all of the aggregates have diameters of less than about 1 $\mu$m (e.g., from about 70 or 100 nm to about 1 $\mu$m), more highly preferred that substantially all of the aggregates have diameters of less than about 500 nm (e.g., from about 70 or 100 nm to about 500 nm), even more highly preferred that substantially all of the aggregates have diameters of less than about 400 nm (e.g., from about 70 or 100 nm to about 400 nm), yet more highly preferred that substantially all of the aggregates have diameters of less than about 300 nm (e.g., from about 70 or 100 nm to about 300 nm). Desirably, substantially all of the aggregates have mean diameters of less than about 200 nm (e.g., from about 70 or 100 nm to about 200 nm).

The primary particles and/or aggregates in the first group can have a relatively wide or narrow range of individual particle diameters. For instance, the primary particles, aggregate particles, or both, can be monodispersed. By monodispersed is meant that the particles have diameters that are substantially identical. For example, substantially all monodispersed 55 nm particles have diameters in the range of from about 50 nm to about 60 nm. It is preferred that the range of diameters of monodispersed particles be narrower (e.g., from about 53 to about 57 nm for monodispersed 55 nm particles), and more preferred that the range be even narrower (e.g., from about 54 nm to about 56 nm for monodispersed 55 nm particles).

The coating comprises a second group (population) of particles in addition to the first group of metal oxide particles. It is believed that the particles in the second group, which have a mean diameter at least about 50% smaller than the mean diameter of the aggregates in the first group, improve the packing of the metal oxide aggregates by filling in the void space between the aggregate particles. This provides a more densely packed glossy coating, which is non-brittle, resists cracking, and is strongly adhesive. However, even though the particles in the coating are densely packed, with minimal inter-particle voids, the coating retains a high porosity due to the intra-particle voids of the aggregate particles.

It has been found that the packing density of the glossy coating on the recording medium of the present invention is increased when the coating comprises first and second groups of particles, wherein the particles in the second group have a smaller mean diameter than the aggregates in the first group. For example, the particles in the second group can have a mean diameter of less than about 50% of the mean diameter of the aggregates in the first group. The particles in the second group also can have a mean diameter of less than about 40% of the mean diameter of the aggregates in the first group, or even less than about 30% (e.g., less than about 20% of the mean diameter of the aggregates in the first group). In some cases, it can be desirable for substantially all of the particles in the second group to have mean diameter of less than about 10% of the mean diameter of the aggregates in the first group.

Desirably, the particles in the second group have a mean diameter of less than about 300 nm (e.g., from about 1 nm to about 300 nm). Typically, the particles in the second group have a mean diameter of less than about 200 nm (e.g, from about 1 nm to about 200 nm). Preferably, the particles in the second group have a mean diameter of less than about 100 nm (e.g., from about 1 nm to about 100 nm), more preferably, less than about 50 nm (e.g, from about 1 nm to about 50 nm), even more preferably about 35 nm or less (e.g., from about 1 nm to about 35 nm). In a particularly preferred embodiment, the mean diameter of the particles in the second group is from about 20 nm to about 35 nm. In some cases, the mean diameter of the particles in the second group can even be less than about 20 nm (e.g., from about 1 nm to about 20 nm).

Although particles having a broad range of individual diameters can be used in the second group, it is preferred that substantially all of the particles in the second group have diameters that are smaller than the mean diameter of the aggregates in the first group. In particular, it is preferred that substantially all of the particles in the second group have diameters of less than about 50% of the mean diameter of the aggregates in the first group. It is more preferred that substantially all of the particles in the second group have diameters of less than about 40% of the mean diameter of the aggregates in the first group. More preferably, substantially all of the particles in the second group have diameters of less than about 30% of the mean diameter of the aggregates in the first group. Even more preferably, substantially all of the particles in the second group can have diameters of less than about 20% of the mean diameter of the aggregates in the first group. In some cases, it may be desirable for substantially all of the particles in the second group to have diameters of less than about 10% of the mean diameter of the aggregates in the first group.

It is highly preferred that substantially all of the particles in the second group have diameters that are smaller than the diameters of substantially all of the aggregates in the first group. In particular, it is highly preferred that substantially all of the particles in the second group have diameters of less than about 50% of the diameters of substantially all of the aggregates in the first group. It is more preferred that substantially all of the particles in the second group have diameters of less than about 40% of the diameters of substantially all of the aggregates in the first group. For example, substantially all of the particles in the second group can have diameters of less than about 30% of the diameters of substantially all of the aggregates in the first group. Desirably, substantially all of the particles in the second group have diameters of less than about 20% of the diameters of substantially all of the aggregates in the first group. In some cases, it may be desirable for substantially all of the particles in the second group to have diameters of less than about 10% of the diameters of substantially all of the aggregates in the first group.

More particularly, it is preferred that substantially all of the particles in the second group have diameters of less than about 300 nm (e.g., from about 1 nm to about 300 nm), more highly preferred that substantially all of the particles in the second group have diameters of less than about 200 nm (e.g., from about 1 nm to about 200 nm), even more highly preferred that substantially all of the particles in the second group have diameters of less than about 100 nm (e.g., from about 1 nm to about 100 nm), and most highly preferred that substantially all of the particles in the second group have diameters of less than about 50 nm (e.g., from about 1 nm to about 50 nm).

Particles having a very narrow range of individual diameters, such as monodispersed particles, also can be used in the second group.

The second group of particles also can comprise two or more portions of particles. If the second group of particles comprises two or more portions of particles, it is preferred that each portion accounts for at least about 1% by weight of the total particles in the second group. It is more preferred that each portion accounts for at least about 5% by weight of the total particles in the second group, and most preferred that each portion accounts for at least about 10% by weight of the total particles in the second group. Each portion can comprise particles of differing materials (vide infra), differing mean diameters, and/or differing diameter ranges. For example, zero, one, two or more portions of monodispersed particles can be used in the second group. If two or more portions of monodispersed particles are used, it is preferred that the portions have unique (i.e., different) mean diameters. For example, the particles in the second group in a given glossy coating can comprise 20% by weight of a portion of alumina particles having a mean diameter of about 150 nm, 30% by weight of a portion of monodispersed polystyrene latex beads having a mean diameter of 55 nm, and 50% by weight of a portion of monodispersed colloidal silica particles with a mean diameter of 35 nm.

The particles in the second group can be charged or uncharged, and if charged, can be cationic, anionic, or amphoteric. It is sometimes preferred that cationic particles be included in the glossy coating. Although many metal oxides are either neutral or anionic, they can be made cationic via surface modification. For example, silica, which is anionic, can be made cationic by treating the silica with a cationic modifier such as an inorganic cationic modifier or an organic cationic modifier as described herein.

The particles in the second group can comprise any suitable materials, such as metal oxides and synthetic polymers. Examples of suitable materials include silica (e.g., colloidal or pyrogenic silica), alumina (e.g., alumina sols, colloidal alumina, cationic aluminum oxide or hydrates thereof, pseudoboehmite, etc.), surface-treated cationic colloidal or pyrogenic silica, magnesium silicate, aluminum silicate, magnesium carbonate, calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, aluminum hydroxide, lithopone, zeolite, hydrated halloycite, magnesium hydroxide, polyolefins (e.g., polystyrene, polyethylene, polypropylene, etc.), plastics (e.g., acrylic), urea resin, and melamine resin, with silica and polyolefins being preferred, and colloidal silica and polystyrene being highly preferred.

Many physical properties of the glossy coating on the recording medium of the present invention can be rationally optimized by varying the relative quantity of particles from each group contained therein. Although the particles in the second group can be porous, the porous metal oxide aggregates of the first group will typically have a greater impact on the resulting liquid absorption characteristics of the coating (e.g., rate of absorption and absorption capacity). Thus, if a recording medium comprising a substrate with a highly absorptive glossy coating is desired, the relative quantity of particles from the first group can be increased, and the relative quantity of particles from the second group decreased. On the other hand, if a recording medium comprising a substrate with a highly durable, crack-resistant, non-brittle, adherent glossy coating is desired, the relative quantity of particles from the first group can be decreased, and the relative quantity of particles from the second group increased. In particular, it is preferred that the recording medium of the present invention comprise a coated substrate, wherein the coating comprises a ratio of particles from the first group to particles in the second group (all portions) of from about 0.1:1 to about 10:1 by weight, it is more preferred that the ratio of particles from the first group to the second group be from about 0.2:1 to about 8:1 by weight, even more preferably from about 0.3:1 to about 7:1 by weight, still more preferably from about 0.4:1 to about 6:1 by weight, yet more preferably from about 0.5:1 to about 5:1 by weight, and most preferably from about 0.6:1 to about 4:1 by weight (e.g., from about 1:1 to about 3:1 by weight). In a particularly preferred embodiment, the ratio of the particles from the first group to the second group is about 4:1 by weight.

The recording medium of the present invention preferably comprises a substrate coated with a coating comprising one or more binders, which serve to bind the particles in the first and second groups to each other, and to the substrate. If one or more binders are used, the relative ratio of the total particles in the first and second groups to the total amount of binder(s) is preferably from about 1:1 to about 10:1 by weight, more preferably from about 1.5:1 to about 8:1 by weight (e.g., from about 1.5:1 to about 5:1 by weight), even more preferably from about 2:1 to about 6:1 by weight, and most preferably from about 2:1 to about 4:1 or 5:1 by weight (e.g., about 3:1 by weight). Preferred binders include, but are not limited to, polyvinyl alcohol (PVOH), polyvinyl acetate, polyvinyl acetal, polyvinyl pyrrolidone, oxidized starch, etherified starch, cellulose derivatives (e.g., carboxymethyl cellulose (CMC), hydroxyethyl cellulose, etc.), casein, gelatin, soybean protein, silyl-modified polyvinyl alcohol, conjugated diene copolymer latexes (e.g., maleic anhydride resin, styrene-butadiene copolymer, methyl methacrylate-butadiene copolymers, etc.), acrylic polymer latexes (e.g., polymers and copolymers of acrylic esters and methacrylic esters, polymers and copolymers of acrylic acid and methacrylic acid, etc.), vinyl polymer latexes (e.g., ethylene-vinyl acetate copolymer), functional group-modified polymer latexes obtained by modifying the above-mentioned various polymers with monomers containing functional groups (e.g., carboxyl groups), aqueous binders such as thermosetting resins (e.g., melamine resin, urea resin, etc.), synthetic resin binders such as polymethyl methacrylate, polyurethane resin, polyester resin (e.g., unsaturated polyester resin), amide resin, vinyl chloride-vinyl acetate copolymer, polyvinyl butyral, and alkyd resin, with polyvinyl alcohol being most preferred.

It has been found that the glossy coating comprising first and second groups of particles exhibits a high degree of adhesiveness, both between the particles themselves and between the particles and the substrate of the recording medium of the present invention. The adhesiveness is exemplified by both an increased crack-resistance of the dry, glossy coating, and an increase in pick strength. The crack resistance of the coating can be qualitatively measured by visual inspection, and the pick strength can be quantified according to TAPPI T 499 and TAPPI UM 507.

The glossy coating of the recording medium of the present invention also can comprise one or more other additives, such as surfactants (e.g., cationic surfactants, anionic surfactants such as long-chain alkylbenzene sulfonate salts and long-chain, preferably branched chain, alkylsulfosuccinate esters, nonionic surfactants such as polyalkylene oxide ethers of long-chain, preferably branched-chain alkyl group-containing phenols and polyalkylene oxide ethers of long-chain alkyl alcohols, and fluorinated surfactants), silane coupling agents (e.g., γ-aminopropyltrimethoxysilane, N-β (aminoethyl) γ-aminopropyltrimethoxysilane, etc.), hardeners (e.g., active halogen compounds, vinylsulfone compounds, aziridine compounds, epoxy compounds, acryloyl compounds isocyanate compounds, etc.), pigment dispersants, thickeners (e.g., carboxymethyl cellulose (CMC)), flowability improvers, antifoamers (e.g., octyl alcohol, silicone-based antifoamers, etc.), foam inhibitors, releasing agents, foaming agents, pentetrants, coloring dyes, coloring pigments, whiteners (e.g., fluorescent whiteners), preservatives (e.g., p-hydroxybenzoate ester compounds, benzisothiazolone compounds, isothiazolone compounds, etc.), antifungal agents, yellowing inhibitors (e.g., sodium hydroxymethanesulfonate, sodium p-toluenesulfinate, etc.), ultraviolet absorbers (e.g., benzotriazole compounds having a hydroxy-dialkylphenyl group at the 2-position), antioxidants (e.g., sterically hindered phenol compounds), antistatic agents, pH regulators (e.g., sodium hydroxide, sodium carbonate, sulfuric acid, hydrochloric acid, phosphoric acid, citric acid, etc.), water-resisting agents, wet strengthening agents, and dry strengthening agents.

The inventive recording medium has an excellent rate of liquid (e.g., ink) absorption, a relatively high liquid absorption capacity, and a durable, rub-resistant, crack-resistant, glossy surface. Any suitable printing method can be used to apply an image to the inventive recording medium. Such printing methods include, but are not limited to gravure, letterpress, collotype, lithography (e.g., offset lithography), ink-jet, and printing with hand-held implements (e.g., pens), with ink-jet printing being preferred.

Coating Composition

The present invention also provides a coating composition that can be used to apply a glossy coating to a substrate. The inventive coating composition has a solids content of at least about 15% by weight, an apparent viscosity at relatively high shear rate of less than about 100 centipoise at 22° C., and comprises a suitable binder and first and second groups of particles, wherein:

(a) the first group comprises metal oxide particles, wherein the metal oxide particles are aggregates of smaller, primary particles, (b) the mean diameter of the primary particles is less than about 100 nm, (c) the mean diameter of the aggregates is from about 100 nm to about 500 nm, (d) the mean diameter of the particles in the second group is less than about 50% of the mean diameter of the aggregates in the first group, and (e) the ratio of particles in the first group to particles in the second group is from about 0.1:1 to about 10:1 by weight.

The coating composition of the present invention typically includes a suitable carrier. The carrier can be any suitable fluid or combination of fluids (e.g., solvents) in which the first and second groups of particles, and any other additives (e.g., one or more binders), can be mixed and applied to a substrate. Preferred carriers have a relatively high vapor pressure to accelerate drying of the coating after application, and preferred examples include, but are not limited to, organic solvents (e.g., methanol) and water, with water being most preferred.

The primary features of the coating composition of the present invention are as previously described with respect to the recording medium of the present invention. For example, the properties of the first and second groups of particles (i.e., materials, diameters, relative quantities, etc.) are as previously described, and the properties of a glossy coating prepared using the inventive coating composition (i.e., glossiness, rate and capacity of liquid absorption, packing density, adhesiveness, pick strength, crack resistance, etc.), and any additives contained therein (e.g., surfactants, silane coupling agents, hardeners, etc.) are as previously described.

As previously described, many physical properties of a glossy coating prepared with the coating composition of the present invention, can be rationally optimized by varying the relative quantity of particles from each group contained therein. It will be appreciated that materials other than the metal oxide particles (e.g., the binders, thickeners, and the like) can be varied to alter or optimize the physical properties of the composition of the present invention.

It has been found that the ultimate physical properties of a glossy coating prepared with the inventive composition (e.g., rate of liquid absorption, absorption capacity, brittleness, crack-resistance, etc.) is related to the coating structure. Some of the ultimate physical properties of the coating structure can be related to the apparent viscosity of the composition from which the coating is derived. In some cases, the coating structure can be related to the apparent viscosity of the coating composition from which the coating is derived. The relative quantity of particles from each of the first and second groups impacts the apparent viscosity of the coating composition of the present invention. For some compositions, particularly those that have identical component particles, an increase in the quantity of particles from the second group relative to the first group, tends to exhibit a decrease in apparent viscosity, which can be related to an increase in crack-resistance of the dry, glossy coating.

The apparent viscosity of the coating composition of the present invention is, of course, also dependent on the solids content of the composition. It is sometimes preferred that the composition dry relatively quickly to form a non-tacky glossy coating. In such cases, it is preferred that the solids content of the composition be high, and the amount of carrier be low. For the purposes of the present invention, it is preferred that the solids content of the inventive coating composition be at least about 15% by weight, more preferred that the solids content be at least about 20% by weight, and most preferred that the solids content be at least about 30% by weight. It will be appreciated that the apparent viscosity of the coating composition of the present invention also is a function of other factors, for example, shear rate. The coating composition of the present invention preferably exhibits shear thinning to a degree which is desirable for a high-speed application characteristic of commercial coating processes. At a relatively high shear rate, for example, produced by a Hercules® High-Shear Viscometer at 4400 RPM (Bob: FF measuring geometry), the apparent viscosity can be below about 100 centipoise for a particular composition. The same composition can have a significantly higher apparent viscosity at a relatively low shear rate (e.g., as high as 500–1200 centipoise when measured by a Brookfield Model RV viscometer at 100 RPM, spindle #4, after 30 seconds).

It is preferred that the apparent viscosity of the inventive coating composition be less than about 100 centipoise at about 22° C. at a solids content of about 15% by weight when measured in a Hercules® High-Shear Viscometer at 4400 rpm (Bob: FF measuring geometry), more preferred that the apparent viscosity under these conditions be less than about 50 centipoise, even more preferably less than about 40 centipoise, still more preferably less than about 30 centipoise, yet more preferably less than about 20 centipoise, and most preferably less than about 10 centipoise at about 22° C. at a solids content of about 15% by weight. Of course, other factors can influence the apparent viscosity of a coating composition having a particular solids content, for example, the pigment to binder ratio (ratio of dry particles to dry binder by weight).

When polyvinyl alcohol (PVOH) is used as a binder and the pigment to binder ratio is 5:1, it is preferred that the apparent viscosity of the coating composition of the present invention (without a thickener, as measured in a Hercules® High-Shear Viscometer at 4400 RPM (Bob: FF measuring geometry)) is less than about 100 centipoise at about 22° C. at a solids content of about 20% by weight. More preferably, the apparent viscosity of the coating composition of the present invention under these conditions is less than about 50 centipoise, even more preferably less than about 40 centipoise, still more preferably less than about 30 centipoise, and most preferably less than about 20 centipoise.

The coating composition of the present invention preferably comprises one or more binders, which serve to bind the particles in the first and second groups to each other, and to the substrate to which the composition is applied. If one or more binders is used in the coating composition of the present invention, the total amount of binder (i.e., dry binder) is preferably from about 1% to about 50% of the composition (i.e., dry binder and particles combined) by weight. More preferably, the total amount of binder is from about 1% to about 40% of the composition by weight, even more preferably from about 1% to about 30% by weight, still more preferably from about 3% to about 25% by weight, yet more preferably from about 5% to about 15% by weight, and most preferably from about 5% to about 10% by weight (e.g., about 7% by weight). The ratio of the total particles in the first and second groups, to the total binder, is as previously described, as are preferred binders.

When PVOH is used as a binder, the total amount of PVOH is preferably from about 1% to about 50% of the composition by weight, more preferably from about 1% to about 40% by weight, even more preferably from about 3% to about 40% by weight, yet more preferably from about 10% to about 30% by weight, and most preferably from about 20% to about 30% by weight.

The inventive coating composition can be used in any application wherein a glossy coating having an excellent rate of liquid absorption, a relatively high liquid absorption capacity, and a durable, crack-resistant surface is desired. In a preferred use, the inventive composition can be applied to a substrate (e.g., paper or film) to form a glossy, ink absorptive layer on a recording medium. The coating composition can be applied to a substrate using any suitable method or combination of methods to form a glossy, ink absorptive coating. Suitable methods include, but are not limited to, roll coating, blade coating, air knife coating, rod coating, bar coating, cast coating, gate roll coating, wire bar coating, short-dowel coating, slide hopper coating, curtain coating, flexographic coating, gravure coating, Komma coating, size press coating in the manner of on- or off-machine, and die coating, with rapid, inexpensive methods such as rod coating and air knife coating being preferred. In a highly preferred application, a glossy, ink-absorptive coating is applied to a recording medium for use in ink-jet printing.

Method of Preparing a Recording Medium

The present invention also provides a method of preparing a recording medium. The inventive method of preparing a recording medium comprises:

(a) providing a substrate, (b) coating the substrate with a coating composition to form substrate having a glossy coating, wherein said coating composition has a solids content of at least about 15% by weight, an apparent viscosity (when measured in a Hercules® High-Shear Viscometer at 4400 RPM (Bob: FF measuring geometry)) of less than about 100 centipoise at about 22° C., and comprises a binder, a suitable carrier, and first and second groups of particles, wherein:

(i) the first group comprises metal oxide particles, wherein the metal oxide particles are aggregates of smaller, primary particles, (ii) the mean diameter of the primary particles is less than about 100 nm, (iii) the mean diameter of the aggregates is from about 100 nm to about 500 nm, (iv) the mean diameter of the particles in the second group is less than about 50% of the mean diameter of the aggregates in the first group, (v) the ratio of particles in the first group to particles in the second group is from about 0.1:1 to about 10:1 by weight, and (c) drying the substrate having a glossy coating to form the recording medium. The recording medium also can optionally be calendered to further enhance gloss.

The primary features of the inventive method are as previously described with respect to the recording medium and coating composition of the present invention. For example, the preferred substrates, coating methods, coating composition (e.g., solids content, binder content, apparent density, additives, etc.), properties of the first and second groups of particles (i.e., materials, diameters, relative quantities, etc.), coating properties (i.e., thickness, number and constitution of coating layers, glossiness, rate and capacity of liquid absorption, packing density, adhesiveness, pick strength, crack resistance, etc.), are as previously described.

The coated substrate can be dried using any suitable method. Suitable drying methods include, but are not limited to, air or convection drying (e.g., linear tunnel drying, arch drying, air-loop drying, sine curve air float drying, etc.), contact or conduction drying, and radiant-energy drying (e.g., infrared drying and microwave drying).

A glossy recording medium prepared according to the method of the present invention has an excellent rate of liquid (e.g., ink) absorption, a relatively high liquid absorption capacity, and a durable, rub-resistant, crack-resistant, glossy surface. Any suitable printing method can be used to apply an image to a recording medium prepared according to the present inventive method. Such printing methods include, but are not limited to gravure, letterpress, collotype, lithography (e.g., offset lithography), ink-jet, and printing with hand-held implements (e.g., pens), with ink-jet printing being preferred.

The inventive recording medium, coating composition, and method for the preparation of a recording medium can best be understood by reference to the following examples. These examples further illustrate the present invention but, of course, should not be construed as in any way limiting its scope.

EXAMPLE 1

This example illustrates the preparation of a coating composition of the present invention. An initial aqueous silica slurry containing 25% solids was prepared. The solids in the initial slurry contained two distinct populations of silica particles, which were 80% by weight PTG fumed silica (available from Cabot Corporation, Boston, Mass.) and 20% by weight LUDO™ colloidal silica (E.I. DuPont de Nemours, Wilmington, Del.). PTG is a fumed silica (surface area approximately 200 $m^2/g$) whose particles are aggregates having a mean diameter of about 180 nm, as measured using a Brookhaven 90 Plus Particle Size Analyzer. The aggregates of PTG are made up of smaller primary particles (mean diameter of about 12 nm as reported by the manufacturer). LUDOX™ is a relatively monodisperse substantially non-aggregated colloidal silica whose particles have a mean diameter of 22 nm, as reported by the manufacturer.

A PVOH solution (prepared at 30% solids) was added to the initial silica slurry at low agitation until the ratio of silica to PVOH (pigment to binder ratio) was 5:1 by weight. The solids content of the composition was measured and water was added, if needed, until the final dispersion had a total solids content (including PVOH) of 20%. The pH of the final dispersion was 9.68. Thus formed was a coating composition of the present invention.

Comparative Example 1A

This example illustrates the preparation of a coating composition having only one type of population of particles. An initial aqueous silica slurry of 30% solids content containing only PTG fumed silica (see Example 1 for a description of PTG) was prepared. A PVOH solution (prepared at 30% solids) was added to the initial silica slurry at low agitation until the ratio of silica to PVOH was 5:1 by weight. The solids content of the composition was measured and water was added, if needed, until the resulting dispersion had a total solids content (including PVOH) of 20%. The pH of the final dispersion was 10.19.

EXAMPLE 2

A coating composition of the present invention was prepared in accordance with Example 1, except that the total solids content of the final composition (including PVOH) was 25%. The pH of the final dispersion was 9.43.

Comparative Example 2A

A coating composition having only one type of population of silica particles was prepared in accordance with Comparative Example 1A, except that the total solids content of the final composition (including PVOH) was 25%. The pH of the final dispersion was 10.34.

EXAMPLE 3

This example illustrates the preparation of a coating composition of the present invention. An initial aqueous silica slurry containing 25% solids was prepared. The solids in the initial slurry contained two distinct populations of silica particles, which were 80% by weight PTG fumed silica and 20% by weight LUDOX™ colloidal silica. (See Example 1 for a description of PTG fumed silica and LUDOX™ colloidal silica.)

A PVOH solution (prepared at 30% solids) was added to the initial silica slurry at low agitation until the ratio of silica to PVOH was 5:1 by weight. A 3.0% solution of carboxymethyl cellulose (CMC), a thickener, was adjusted to pH 11.5 and was then added to the dispersion until a desired viscosity was attained. The amount of dry CMC relative to the total dry solids was 3.0% by weight. The total solids content of the composition was measured and water was added, if needed, until the resulting dispersion had a total solids content (including PVOH and CMC) of 20% by weight. The pH of the final dispersion was 10.40. Thus formed was a coating composition of the present invention.

Comparative Example 3A

This example illustrates the preparation of a coating composition having only one type of population of silica particles. An initial aqueous silica slurry of 30% solids content containing only PTG fumed silica (see Example 1) was prepared. A PVOH solution (prepared at 30% solids) was added to the initial silica slurry at low agitation until the ratio of silica to PVOH was 5:1 by weight. A 3.0% solution of carboxymethyl cellulose (CMC), a thickener (preadjusted to pH 11.5) was then added to the dispersion until a desired viscosity was attained. The amount of dry CMC relative to the total dry solids was 2.3% by weight. The solids content of the composition was measured and water was added, if needed, until the resulting dispersion had a total solids content (including PVOH and CMC) of 20% by weight. The pH of the final dispersion was 11.15.

EXAMPLE 4

A coating composition was prepared in accordance with Example 3, except the amount of dry CMC relative to the total dry solids was 2.3% by weight. The total solids content of the composition (including PVOH and CMC) was 20% by weight. The pH of the final composition was 9.80.

Comparative Example 4A

A coating composition was prepared in accordance with Comparative Example 3A, except the pH of the final composition was 10.17.

EXAMPLE 5

This example illustrates the improved rheological properties of a coating composition of the present invention. The viscosities of the coating compositions prepared in accordance with Examples 1 and 2, and Comparative Examples 1A and 2A, were measured under relatively low shear conditions and under relatively high shear conditions. Low shear viscosity was measured using a Brookfield Model RV viscometer (manufactured by Brookfield Engineering Laboratories, Inc., Stoughton, Mass.) at 100 RPM, spindle #4, after 30 seconds. High shear viscosity was measured using a HERCULES® High-Shear Viscometer at 4400 RPM (Bob: FF measuring geometry). All viscosities were measured at about 22° C. The results are shown in Table 1.

TABLE 1

| Composition | Solids Content | Apparent Viscosity at Low Shear (centipoise) | Apparent Viscosity at High Shear (centipoise) |
| --- | --- | --- | --- |
| Example 1 | 20% | 30 | 13.1 |
| Example 1A | 20% | 40 | 16.3 |
| Example 2 | 25% | 60 | 33.5 |
| Example 2A | 25% | 76 | 44.9 |

Rheograms were generated for the compositions of Examples 1, 1A, 2, and 2A using a HERCULES® High-Shear Viscometer from 0–4400 RPM (Bob: FF measuring geometry, spring: 250). The rheograms are shown in FIG. 1. The rheograms generated by the compositions of the present invention (Examples 1 and 2) are designated 1 and 2 in FIG. 1, respectively. The rheograms generated by the compositions of Comparative Examples 1A and 2A are designated 1A and 2A in FIG. 1, respectively.

These data demonstrate that the coating composition of the present invention has improved rheological properties over an analogous composition having only one type of particle population. The coating composition of the present invention (Examples 1 and 2) exhibited excellent sheer thinning, which is desirable for high speed applications. Moreover, the compositions of Examples 1 and 2 have lower absolute viscosities than analogous compositions employing only one type of particle population (Comparative Examples 1A and 2A, respectively), as indicated by differences in their rheograms (see FIG. 1: 1 vs. 1A, and 2 vs. 2A).

EXAMPLE 6

This example illustrates the rheological properties of a coating composition of the present invention for which a thickener is included in the composition. The low shear and high shear viscosities of the coating compositions prepared in accordance with Examples 3 and 4, and Comparative Example 3A were measured in accordance with Example 5. The results are shown in Table 2.

TABLE 2

| Composition | CMC relative to total solids (%) | Solids Content | Apparent Viscosity at Low Shear (centipoise) | Apparent Viscosity at High Shear (centipoise) |
| --- | --- | --- | --- | --- |
| Example 3 | 3.0 | 20% | 550 | 34.6 |
| Example 3A | 2.3 | 20% | 305 | 21.9 |
| Example 4 | 2.3 | 20% | 194 | 23.2 |

The higher viscosity of the composition of Example 3 relative to the composition of Comparative Example 3A is due to a higher concentration of thickener. When the relative concentration of thickener is reduced, the low shear and high shear viscosities are reduced (see Example 4). The composition of the present invention (Examples 3 and 4) exhibits good shear thinning, as evidenced by the significant decrease in apparent viscosity at high shear rate. These data demonstrate that the coating composition of the present invention exhibits desirable rheological properties, even in the presence of a thickener. The degree of shear thinning, and relatively low apparent viscosity at high shear rate, demonstrate that the composition of the present invention possesses rheological properties that are desirable for high speed manufacturing operations.

EXAMPLE 7

This example demonstrates the preparation of a glossy recording medium of the present invention and demonstrates that the coating composition of the present invention can produce a high gloss recording medium under high speed coating conditions. The coating compositions of Example 3 and Comparative Example 3A were tested using a CLC (Cylindrical Laboratory Coater) blade coating apparatus at high speed. The CLC simulates conditions that are characteristic of commercial manufacture. The performance of a particular coating composition in the CLC at high speed is indicative of how the coating composition is expected to perform under high speed commercial manufacturing conditions.

Using the CLC, one side of a cellulose paper substrate was coated with the compositions of Example 3 and Comparative Example 3A, at a rate of 3000 feet per minute (914 meters per minute), dried (infrared). The dry coat weight in grams per square meter ($g/m^2$) for each recording medium (i.e., coated substrate) was determined, and the dry recording media (uncalendered) were analyzed. Optical and surface properties were measured for each recording medium and also for the uncoated substrate. PPS (Parker Print Surf) roughness and brightness were measured. Brightness was measured in accordance with TAPPI brightness standard. Glossiness was measured in terms of the 75° specular gloss according to JIS P 8142 using a gloss photometer.

The recording media were calendered, and the 75° specular gloss measurements were determined for the calendered media. The results are shown in Table 3. In Table 3, the recording medium of the present invention (i.e., coated with the coating composition of Example 3) is represented by "3," and the recording medium coated with the coating composition of Comparative Example 3A is represented by "3A." The PPS porosity (ave.) of the uncoated substrate was 128.90.

TABLE 3

| Medium | Coat Wt. ($g/m^2$) | Brightness (%) Ave. | Brightness (%) S.D. | 75° Specular Gloss (%) [Calendered] | PPS Roughness ($\mu$m) Ave. | PPS Roughness ($\mu$m) S.D. |
|---|---|---|---|---|---|---|
| UNCOATED | 0 | 90.38 | 0.26 | 7.20 [N/A] | 4.58 | 0.08 |
| 3 | 7.95 | 91.37 | 0.24 | 17.2 [51.50] | 4.11 | 0.09 |
| 3A | 8.66 | 89.60 | 1.17 | 13.33 [47.20] | 4.37 | 0.31 |

These data demonstrate that the coating composition of the present invention exhibits excellent performance at high speed, producing a glossy recording medium with excellent optical and surface properties under such conditions. These data confirm the experimental evidence that the composition of the present invention possesses rheological properties desirable for high speed manufacturing operations.

The recording medium of the present invention (Example 3) has improved optical and surface properties over an analogous medium that contains only one type of particle population in the coating (Comparable Example 3A). The surface of the recording medium of the present invention of Example 3 is brighter and glossier than the recording medium of Comparative Example 3A, as indicated by the higher values for brightness and gloss. Moreover, the recording medium of the present invention of Example 3 has a lower PPS roughness than the recording medium of Comparative Example 3A. As such, the recording medium of the present invention of Example 3 exhibited a smoother surface. Even after calendering, the recording medium of Example 3 demonstrated improved glossiness over the recording medium Comparative Example 3A.

Figure 2:
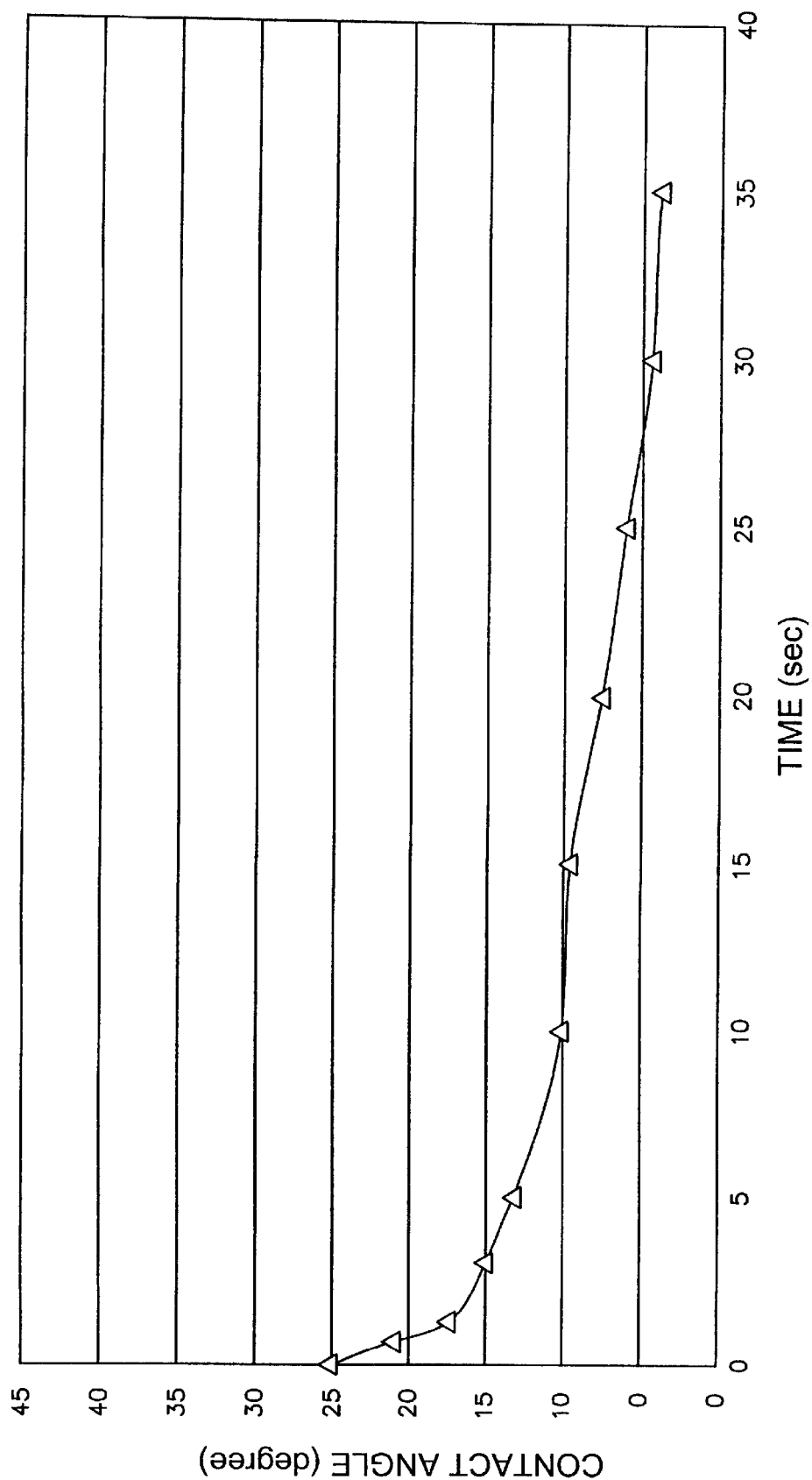
FIG. 2 graphically depicts the change in contact angle over time (absorptivity of distilled water) for a recording medium of the present invention.

The recording medium of the present invention (Example 3) also demonstrated good liquid absorptivity, as indicated in FIG. 2. The contact angle exhibited a sharp initial decrease over the first two minutes, indicating good liquid absorptivity with respect to the recording medium of Example 3. The initial decrease in contact angle over time, as well as the overall observed absorptivity profile, was comparable to the absorptivity profile observed for the recording medium of Comparable Example 3A.

EXAMPLE 8

This example illustrates the preparation of a recording medium and coating composition of the present invention.

An air-knife coater is used to coat one side of a cellulose paper substrate or a polymeric film with a coating composition having the composition recited in Table 4 to provide a coated substrate. The coated substrate is then dried to form a recording medium comprising a substrate having a glossy coating thereon at a coverage on a dry basis of about 15 $g/m^2$. The recording medium is then calendered to enhance gloss.

TABLE 4

| Material | Diameter | Mean Amount | |
|---|---|---|---|
| First Group | Pyrogenic silica | 170 nm | 20 parts by weight |
| Second Group | Colloidal silica | 35 nm | 50 parts by weight |
| Carrier (with binder) | water (pH 9) | | 130 parts by weight |

The apparent viscosity of the coating composition is calculated from the high shear rheogram of the composition using any suitable method.

The glossiness, packing density, pick strength, rate of liquid absorption, liquid absorption capacity, and crack resistance of the calendered recording medium are measured as previously described. All measurements are performed on the side of the substrate having the glossy coating thereon. The crack resistance is measured by visually judging the degree of cracking of the glossy coating after drying, and characterizing the cracking degree as: (a) substantially no cracks visually evident, (b) few cracks visually evident, (c) moderately cracked, or (d) extensively cracked.

EXAMPLE 9

This example illustrates the preparation of the recording medium and coating composition of the present invention.

An air-knife coater is used to coat one side of a cellulose paper substrate or a polymeric film with a coating composition having the composition recited in Table 5 to provide a coated substrate. The coated substrate is then dried to form a recording medium comprising a substrate having a glossy coating thereon at a coverage on a dry basis of about 15 $g/m^2$. The recording medium is then calendered to enhance gloss.

TABLE 5

|  | Material | Mean Diameter | Amount |
|---|---|---|---|
| First Group | Pyrogenic silica | 170 nm | 80 parts by weight |
| Second Group | Colloidal silica | 35 nm | 50 parts by weight |
| Carrier (with binder) | water (pH 9) |  | 370 parts by weight |

The apparent viscosity of the coating composition, and the glossiness, packing density, pick strength, rate of liquid absorption, liquid absorption capacity, and crack resistance of the calendered recording medium are measured as in Example 8.

EXAMPLE 10

This example illustrates the preparation of the recording medium and coating composition of the present invention.

An air-knife coater is used to coat one side of a cellulose paper substrate or a polymeric film with a coating composition having the composition recited in Table 6 to provide a coated substrate. The coated substrate is then dried to form a recording medium comprising a substrate having a glossy coating thereon at a coverage on a dry basis of about 15 g/m². The recording medium is then calendered to enhance gloss.

TABLE 6

|  | Material | Mean Diameter | Amount |
|---|---|---|---|
| First Group | Pyrogenic silica | 170 nm | 20 parts by weight |
| Second Group Portion 1 | Colloidal silica | 35 nm | 50 parts by weight |
| Second Group Portion 2 | Monodispersed polystyrene latex beads | 55 nm | 20 parts by weight |
| Carrier (with binder) | water (pH.9) |  | 130 parts by weight |

The apparent viscosity of the coating composition, and the glossiness, packing density, pick strength, rate of liquid absorption, liquid absorption capacity, and crack resistance of the calendered recording medium are measured as in Example 8.

EXAMPLE 11

This example illustrates the preparation of the recording medium and coating composition of the present invention.

An air-knife coater is used to coat one side of a cellulose paper substrate or a polymeric film with a coating composition having the composition recited in Table 7 to provide a coated substrate. The coated substrate is then dried to form a recording medium comprising a substrate having a glossy coating thereon at a coverage on a dry basis of about 15 g/m². The recording medium is then calendered to enhance gloss.

TABLE 7

|  | Material | Mean Diameter | Amount |
|---|---|---|---|
| First Group | Pyrogenic silica | 170 nm | 20 parts by weight |
| Second Group Portion 1 | Colloidal silica | 35 nm | 50 parts by weight |
| Second Group Portion 2 | Monodispersed polystyrene latex beads | 50 nm | 20 parts by weight |
| Carrier | water (pH 9) |  | 130 parts by weight |
| Binder | Polyvinyl alcohol |  | 20 parts by weight |

The apparent viscosity of the coating composition, and the glossiness, packing density, pick strength, rate of liquid absorption, liquid absorption capacity, and crack resistance of the calendered recording medium are measured as in Example 8.

EXAMPLE 12

This example illustrates the preparation of the recording medium and coating composition of the present invention.

An air-knife coater is used to coat one side of a cellulose paper substrate or polymeric film with a coating composition having the composition recited in Table 8 to provide a coated substrate. The coated substrate is then dried to form a recording medium comprising a substrate having a glossy coating thereon at a coverage on a dry basis of about 15 g/m². The recording medium is then calendered to enhance gloss.

TABLE 8

|  | Material | Mean Diameter | Amount |
|---|---|---|---|
| First Group | Pyrogenic silica | 170 nm | 20 parts by weight |
| Second Group Portion 1 | Colloidal silica | 35 nm | 50 parts by weight |
| Second Group Portion 2 | Monodispersed polystyrene latex beads | 50 nm | 20 parts by weight |
| Second Group Portion 3 | Monodispersed polystyrene latex beads | 20 nm | 10 parts by weight |
| Carrier | water (pH 9) |  | 130 parts by weight |
| Binder | Polyvinyl alcohol |  | 25 parts by weight |
| Other Additives | Brighteners, surfactants |  | 1 part each by weight |

The apparent viscosity of the coating composition, and the glossiness, packing density, pick strength, rate of liquid absorption, liquid absorption capacity, and crack resistance of the calendered recording medium are measured as in Example 8.

EXAMPLE 13

This example illustrates the preparation of the recording medium and coating composition of the present invention.

An air-knife coater is used to coat one side of a cellulose paper substrate or a polymeric film with a coating composition having the composition recited in Table 9 to provide a coated substrate. The coated substrate is then dried to form a recording medium comprising a substrate having a glossy coating thereon at a coverage on a dry basis of about 15 g/m². The recording medium is then calendered to enhance gloss.

TABLE 9

| | Material | Mean Diameter | Amount |
|---|---|---|---|
| First Group | finely milled silica | 170 nm | 80 parts by weight |
| Second Group | Colloidal silica | 35 nm | 50 parts by weight |
| Carrier | water (pH 9) | | 370 parts by weight |

The apparent viscosity of the coating composition, and the glossiness, packing density, pick strength, rate of liquid absorption, liquid absorption capacity, and crack resistance of the calendered recording medium are measured as in Example 8.

EXAMPLE 14

This example illustrates the preparation of the recording medium and coating composition of the present invention.

An air-knife coater is used to coat one side of a cellulose paper substrate or a polymeric film with a coating composition having the composition recited in Table 10 to provide a coated substrate. The coated substrate is then dried to form a recording medium comprising a substrate having a glossy coating thereon at a coverage on a dry basis of about 15 g/m². The recording medium is then calendered to enhance gloss.

TABLE 10

| | Material | Mean Diameter | Amount |
|---|---|---|---|
| First Group | Pyrogenic alumina | 170 nm | 20 parts by weight |
| Second Group Portion 1 | Colloidal silica | 35 nm | 50 parts by weight |
| Second Group Portion 2 | monodispersed polystyrene latex beads | 55 nm | 20 parts by weight |
| Carrier (with binder) | water (pH 9) | | 130 parts by weight |

The apparent viscosity of the coating composition, and the glossiness, packing density, pick strength, rate of liquid absorption, liquid absorption capacity, and crack resistance of the calendered recording medium are measured as in Example 8.

EXAMPLE 15

This example illustrates the preparation of the recording medium and coating composition of the present invention.

An air-knife coater is used to coat one side of a cellulose paper substrate or a polymeric film with a coating composition having the composition recited in Table 11 to provide a coated substrate. The coated substrate is then dried to form a recording medium comprising a substrate having a glossy coating thereon at a coverage on a dry basis of about 15 g/m². The recording medium is then calendered to enhance gloss.

TABLE 11

| | Material | Mean Diameter | Amount |
|---|---|---|---|
| First Group | Pyrogenic alumina | 170 nm | 20 parts by weight |
| Second Group Portion 1 | Colloidal silica | 35 nm | 50 parts by weight |
| Second Group Portion 2 | Monodispersed polystyrene latex beads | 50 nm | 20 parts by weight |
| Carrier | water (pH 9) | | 130 parts by weight |
| Binder | Polyvinyl alcohol | | 20 parts by weight |

The apparent viscosity of the coating composition, and the glossiness, packing density, pick strength, rate of liquid absorption, liquid absorption capacity, and crack resistance of the calendered recording medium are measured as in Example 8.

EXAMPLE 16

This example illustrates the preparation of the recording medium and coating composition of the present invention.

An air-knife coater is used to coat one side of a cellulose paper substrate or polymeric film with a coating composition having the composition recited in Table 12 to provide a coated substrate. The coated substrate is then dried to form a recording medium comprising a substrate having a glossy coating thereon at a coverage on a dry basis of about 15 g/m². The recording medium is then calendered to enhance gloss.

TABLE 12

| | Material | Mean Diameter | Amount |
|---|---|---|---|
| First Group | Pyrogenic alumina | 170 nm | 20 parts by weight |
| Second Group Portion 1 | Colloidal silica | 35 nm | 50 parts by weight |
| Second Group Portion 2 | Monodispersed polystyrene latex beads | 50 nm | 20 parts by weight |
| Second Group Portion 3 | Monodispersed polystyrene latex beads | 20 nm | 10 parts by weight |
| Carrier | water (pH 9) | | 130 parts by weight |
| Binder | Polyvinyl alcohol | | 25 parts by weight |
| Other Additives | Brighteners, surfactants | | 1 part each by weight |

The apparent viscosity of the coating composition, and the glossiness, packing density, pick strength, rate of liquid absorption, liquid absorption capacity, and crack resistance of the calendered recording medium are measured as in Example 8.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A coating composition having a solids content of at least about 15% by weight, and an apparent viscosity, when measured at 4400 RPM, of less than about 100 centipoise at about 22° C., comprising a carrier, a binder, and first and second groups of particles, wherein:
   (a) said first group comprises metal oxide particles, wherein said metal oxide particles are aggregates of smaller, primary particles,
   (b) the mean diameter of said primary particles is less than about 100 nm,
   (c) the mean diameter of said aggregates is from about 100 nm to about 500 nm,
   (d) the mean diameter of the particles in said second group is less than about 50% of the mean diameter of the aggregates in said first group, and
   (e) the ratio of particles in said first group to particles in said second group is from about 0.1:1 to about 10:1 by weight.

2. The composition of claim 1, wherein the solids content of said composition is at least about 20% by weight.

3. The composition of claim 1, wherein said apparent viscosity is less than about 50 centipoise at about 22° C.

4. The composition of claim 1, wherein the mean diameter of said aggregates is from about 100 nm to about 300 nm.

5. The composition of claim 1, wherein the ratio of said first group of particles to said second group of particles is from about 1.5:1 to about 8:1 by weight.

6. The composition of claim 1, wherein said metal oxide is selected from the group consisting of silica, alumina, titania, zirconia, ceria, and magnesia.

7. The composition of claim 6, wherein said metal oxide comprises silica.

8. The composition of claim 1, wherein said first group of particles are pyrogenic metal oxide particles.

9. The composition of claim 1, wherein said second group comprises particles of a material selected from the group consisting of metal oxides and synthetic polymers.

10. The composition of claim 9, wherein said second group comprises particles of silica.

11. The composition of claim 10, wherein said second group comprises particles of colloidal silica.

12. The composition of claim 9, wherein said second group comprises particles of polystyrene.

13. The composition of claim 1, wherein said second group comprises particles having a mean diameter of less than about 100 nm.

14. The composition of claim 1, wherein said second group comprises monodispersed particles.

15. The composition of claim 1, wherein said second group comprises two or more portions of particles, wherein each of said portions accounts for at least about 1% by weight of the total particles in said second group.

16. The composition of claim 15, wherein one or more of said portions comprises monodispersed particles.

17. The composition of claim 1, wherein said first group comprises particles of a cationic metal oxide.

18. The composition of claim 1, wherein said second group comprises cationic particles.

19. The composition of claim 1, wherein substantially all of the particles in the second group have diameters of less than about 50% of the mean diameter of the aggregates in the first group.

20. The composition of claim 19, wherein substantially all of the particles in the second group have diameters of less than about 50% of the diameters of substantially all of the aggregates in the first group.

* * * * *